United States Patent
Holm

(10) Patent No.: US 12,114,644 B2
(45) Date of Patent: Oct. 15, 2024

(54) FEED CONSUMPTION MONITORING SYSTEM

(71) Applicant: ATLANTIC SAPPHIRE IP, LLC, Miami, FL (US)

(72) Inventor: Thue Holm, Vejle (DK)

( * ) Notice: Subject to any disclaimer, the term of this patent is extended or adjusted under 35 U.S.C. 154(b) by 347 days.

(21) Appl. No.: 17/680,125

(22) Filed: Feb. 24, 2022

(65) Prior Publication Data
US 2022/0272952 A1  Sep. 1, 2022

Related U.S. Application Data

(60) Provisional application No. 63/187,126, filed on May 11, 2021, provisional application No. 63/154,274, filed on Feb. 26, 2021.

(51) Int. Cl.
| | |
|---|---|
| *G01N 15/14* | (2024.01) |
| *A01K 61/80* | (2017.01) |
| *G01N 15/1434* | (2024.01) |
| *H04N 7/18* | (2006.01) |
| *H04N 23/54* | (2023.01) |
| *H04N 23/56* | (2023.01) |

(52) U.S. Cl.
CPC ......... *A01K 61/80* (2017.01); *G01N 15/1434* (2013.01); *H04N 7/183* (2013.01); *H04N 23/54* (2023.01); *H04N 23/56* (2023.01)

(58) Field of Classification Search
CPC .............. A01K 61/80; G01N 15/1434; G01N 15/1425; G01N 15/1429; G01N 15/1433; G01N 2015/1486; G01N 15/1459; G01N 33/18; H04N 7/183; H04N 23/56
See application file for complete search history.

(56) References Cited

U.S. PATENT DOCUMENTS

| | | | |
|---|---|---|---|
| 2,643,481 A | 6/1953 | Ederer |
| 3,200,949 A | 8/1965 | Aulich |
| (Continued) | | |

FOREIGN PATENT DOCUMENTS

| | | |
|---|---|---|
| CA | 2711677 | 11/2012 |
| CN | 102329055 | 1/2012 |
| (Continued) | | |

OTHER PUBLICATIONS

Akva Group, Recirculation Systems, 6 pages, <URL:http://www.akvagroup.com/products/land-based-aquaculture/recirculation-systems>.

(Continued)

*Primary Examiner* — Abdullahi Nur
(74) *Attorney, Agent, or Firm* — MALLOY & MALLOY, P.L.

(57) ABSTRACT

A feed consumption monitoring system for monitoring and controlling the quantity of feed introduced to an aquaculture environment. The system includes utilization of a high contrast surface, which receives a supply of running water containing a quantity of feed particles, a camera assembly to capture images of the high contrast surface upon its contact with the supply of running water, and a mount assembly to support the foregoing components, and the system may also include a lighting assembly to illuminate the high contrast surface as well as a software component to analyze such images to determine whether the quantity of feed in the supply of running water is suboptimal.

23 Claims, 5 Drawing Sheets

(56) References Cited

U.S. PATENT DOCUMENTS

| | | |
|---|---|---|
| 3,771,492 A | 11/1973 | Doherty |
| 3,832,720 A | 8/1974 | Cook |
| 4,009,782 A | 3/1977 | Grimshaw |
| 4,052,960 A | 10/1977 | Birkbeck et al. |
| 4,067,809 A | 1/1978 | Kato |
| 4,141,318 A | 2/1979 | MacVane et al. |
| 4,225,543 A | 9/1980 | Hohman |
| 4,394,259 A | 7/1983 | Benny et al. |
| 4,607,595 A | 8/1986 | Busot et al. |
| 4,728,438 A | 3/1988 | Featherstone et al. |
| 4,915,059 A | 4/1990 | Long |
| 4,966,096 A | 10/1990 | Adey |
| 5,038,715 A | 8/1991 | Fahs, II |
| 5,123,195 A | 6/1992 | Hawkins |
| 5,186,121 A | 2/1993 | Smith, Jr. |
| 5,317,645 A | 5/1994 | Perozek et al. |
| 5,385,428 A | 1/1995 | Taft, III et al. |
| 5,540,521 A | 7/1996 | Biggs |
| 5,659,977 A | 8/1997 | Jensen et al. |
| 5,732,654 A | 3/1998 | Perez et al. |
| 5,823,142 A * | 10/1998 | Cardinale ........... A23K 20/105 |
| | | 119/212 |
| 5,961,831 A | 10/1999 | Lee et al. |
| 5,978,315 A | 11/1999 | Molaug |
| 5,979,362 A | 11/1999 | McRobet |
| 6,000,362 A * | 12/1999 | Blyth .................. A01K 61/80 |
| | | 119/51.04 |
| 6,041,738 A | 3/2000 | Hemauer et al. |
| 6,065,430 A | 5/2000 | Sheriff |
| 6,099,879 A | 8/2000 | Todd, Jr. |
| 6,206,612 B1 | 3/2001 | Meyer |
| 6,317,385 B1 | 11/2001 | Hedgepeth |
| 6,382,134 B1 | 5/2002 | Gruenberg et al. |
| 6,443,098 B1 | 9/2002 | Blyth et al. |
| 6,447,681 B1 | 9/2002 | Carlberg et al. |
| 6,474,264 B1 | 11/2002 | Grimberg et al. |
| 6,499,431 B1 | 12/2002 | Lin et al. |
| 6,722,314 B1 | 4/2004 | Crisinel et al. |
| 6,902,675 B2 | 6/2005 | Kelly et al. |
| 6,932,025 B2 | 8/2005 | Massingill et al. |
| 6,986,323 B2 | 1/2006 | Ayers |
| 6,988,394 B2 | 1/2006 | Shedd et al. |
| 7,001,519 B2 | 2/2006 | Linden et al. |
| 7,082,893 B2 | 8/2006 | Schreier et al. |
| 7,462,284 B2 | 12/2008 | Schreier et al. |
| 7,594,779 B2 | 9/2009 | Hildstad et al. |
| 7,736,509 B2 | 6/2010 | Kruse |
| 8,117,992 B2 | 2/2012 | Parsons et al. |
| 8,141,515 B2 | 3/2012 | Nien |
| 8,506,811 B2 | 8/2013 | Bradley et al. |
| 8,535,883 B2 | 9/2013 | Cane et al. |
| 8,633,011 B2 | 1/2014 | Palmer et al. |
| 9,637,402 B2 | 5/2017 | Tal et al. |
| 9,756,838 B2 | 9/2017 | Kunitomo et al. |
| 10,034,461 B2 | 7/2018 | Holm et al. |
| 10,131,558 B1 | 11/2018 | Cox, Jr. et al. |
| 10,338,631 B1 * | 7/2019 | Jorden .............. G01N 33/1893 |
| 10,660,315 B1 | 5/2020 | Alcantar et al. |
| 10,694,722 B1 | 6/2020 | Holm et al. |
| 10,748,278 B2 | 8/2020 | Brubacher |
| 10,959,411 B2 | 3/2021 | Holm |
| 11,425,895 B2 | 8/2022 | Holm et al. |
| 11,484,015 B2 | 11/2022 | Holm et al. |
| 11,596,132 B2 | 3/2023 | Holm |
| 11,627,729 B2 | 4/2023 | Holm et al. |
| 11,662,291 B1 | 5/2023 | Holm |
| 11,785,921 B2 | 10/2023 | Holm |
| 2003/0059494 A1 * | 3/2003 | Ang ..................... A23K 50/80 |
| | | 426/805 |
| 2003/0070624 A1 | 4/2003 | Zohar et al. |
| 2003/0104353 A1 | 6/2003 | Brielmeier et al. |
| 2003/0121859 A1 | 7/2003 | Kelly et al. |
| 2004/0168648 A1 | 9/2004 | Ayers |
| 2004/0244715 A1 | 12/2004 | Schreier et al. |
| 2005/0211644 A1 | 9/2005 | Goldman |
| 2006/0055934 A1 * | 3/2006 | Sunshine ........... G01N 15/0227 |
| | | 356/446 |
| 2007/0221552 A1 | 9/2007 | Denney |
| 2007/0242134 A1 | 10/2007 | Zernov |
| 2008/0000821 A1 * | 1/2008 | Drewelow ................ C02F 1/20 |
| | | 210/150 |
| 2008/0223788 A1 | 9/2008 | Rimdzius et al. |
| 2009/0145368 A1 | 6/2009 | Brauman |
| 2009/0250010 A1 | 10/2009 | Urusova et al. |
| 2010/0081961 A1 | 4/2010 | Cox |
| 2010/0092431 A1 | 4/2010 | Liles et al. |
| 2010/0236137 A1 | 9/2010 | Wu et al. |
| 2010/0269761 A1 | 10/2010 | Nien |
| 2011/0046603 A1 | 2/2011 | Felsovalyi et al. |
| 2011/0060533 A1 * | 3/2011 | Jorden ................... G01N 33/18 |
| | | 702/29 |
| 2011/0168616 A1 | 7/2011 | Robertson et al. |
| 2011/0250604 A1 | 10/2011 | Cane et al. |
| 2011/0258915 A1 | 10/2011 | Subhadra |
| 2012/0103271 A1 | 5/2012 | Kong |
| 2012/0125940 A1 | 5/2012 | Wright et al. |
| 2012/0184001 A1 | 7/2012 | Stephen et al. |
| 2013/0098303 A1 | 4/2013 | Jones |
| 2013/0273599 A1 * | 10/2013 | Robitaille .............. A01K 61/80 |
| | | 356/73 |
| 2013/0319342 A1 | 12/2013 | Musser |
| 2013/0327709 A1 | 12/2013 | Stroot |
| 2014/0261213 A1 | 9/2014 | Stiles, Jr. et al. |
| 2014/0293040 A1 * | 10/2014 | Hietaniemi ............ G01N 21/85 |
| | | 348/88 |
| 2015/0167045 A1 | 6/2015 | Brubacher |
| 2015/0230439 A1 | 8/2015 | Harwood |
| 2015/0250113 A1 | 9/2015 | Shoham et al. |
| 2015/0256747 A1 | 9/2015 | Grotto et al. |
| 2015/0342161 A1 | 12/2015 | Sheriff |
| 2015/0347817 A1 * | 12/2015 | Valvik .................. H04N 13/296 |
| | | 382/133 |
| 2015/0366173 A1 | 12/2015 | Myers |
| 2016/0356756 A1 | 12/2016 | Covi |
| 2017/0260546 A1 | 9/2017 | Qimron et al. |
| 2017/0299382 A1 | 10/2017 | Yang et al. |
| 2018/0125041 A1 | 5/2018 | Holm et al. |
| 2019/0008126 A1 | 1/2019 | Shishehchian |
| 2019/0071336 A1 | 3/2019 | Greenwald et al. |
| 2019/0082661 A1 | 3/2019 | Lahav et al. |
| 2019/0135393 A1 | 5/2019 | Pieterkosky |
| 2019/0141964 A1 | 5/2019 | Perslow et al. |
| 2019/0169046 A1 | 6/2019 | Holm |
| 2019/0200584 A1 | 7/2019 | Holm |
| 2020/0396970 A1 | 12/2020 | Holm et al. |
| 2021/0127646 A1 | 5/2021 | Holm |
| 2021/0137082 A1 | 5/2021 | Holm |
| 2021/0195874 A1 | 7/2021 | Holm et al. |
| 2021/0227807 A1 | 7/2021 | Holm et al. |
| 2021/0235010 A1 | 7/2021 | Wallace et al. |
| 2021/0274758 A1 | 9/2021 | Holm et al. |
| 2021/0275604 A1 | 9/2021 | Holm |
| 2021/0278378 A1 | 9/2021 | Holm |

FOREIGN PATENT DOCUMENTS

| | | |
|---|---|---|
| DM | 205963 | 3/2020 |
| GB | 2464686 | 4/2010 |
| JP | H01112935 | 5/1989 |
| WO | WO200241703 | 5/2002 |
| WO | WO2006042371 | 4/2006 |
| WO | WO2008094132 | 8/2008 |
| WO | WO2016154602 | 9/2016 |
| WO | WO2017002081 | 1/2017 |
| WO | WO017153986 | 9/2017 |
| WO | WO2018184029 | 4/2018 |
| WO | WO2018169412 | 9/2018 |
| WO | WO2021150873 | 7/2021 |
| WO | WO2021162847 | 8/2021 |
| WO | WO2021178080 | 9/2021 |
| WO | WO2021178431 | 9/2021 |
| WO | WO2021216225 | 10/2021 |
| WO | WO2021221745 | 11/2021 |

(56) References Cited

FOREIGN PATENT DOCUMENTS

OTHER PUBLICATIONS

Notice of Draft Permit, South Dade News Leader, Homestead, Miami Dade County, Florida, 1 page, Sep. 13, 2013.
Garcia-Bengochea, Jose I et al., Deep Wall Disposal of Waste Waters in Saline Aquifers of South Florida, Abstract, American Geophysical Union Water Resources Research, vol. 6, Issue 5, Oct. 1970 1 page, Oct. 1, 1970.
Gorman, J, L. et al., Economic Feasibility of Utilizing West Alabama Saline Groundwater to Produce Florida Pompano and Hybrid Striped Bass in a Recirculating Aquaculture System, Alabama Agricultural Experiment Station, Auburn University, 19 pages, Dec. 1, 2009.
Mark R. Howard, Down the Drain, Florida Trend, http://www.floridatrend.com/print/article/13274, 2 pages, Jan. 1, 2000.
Notice of Intent, South Dade News Leader, Homestead, Miami Dade County, Florida, 1 page, Oct. 18, 2013.
Lindholm-Lehto et al., Depuration of Geosmin and 2 mehtylisobomeol-induced off-flavors in recirculation aquacultre system (RAS) farmed European whitefish coregonus lavaretus, Jul. 10, 2019.
Milchman, Jon, Construction Clearance Permit Application, Florida Department of Environmental Protection, (FDEP), 5 pages, May 12, 2013.
Notice of Permit, Florida Department of Environmental Protection, 18 pages, Nov. 4, 2013.
Sharrer, Mark J. et al., Evaluation of Geotextile filtration applying coagulant and biosolids dewatering and phosphorus removal, Aquacultural Engineering, vol. 40, Issue 1,, 10 Pages, <URL:https://www.sciencedirect.com/science/article/pii/S0144860908000678> (Accessed Dec. 4, 2017), Jan. 1, 2009.
Small, Brian et al., On the Feasibility of Establishing a Saline Aquaculture Industry in Illinois, Illinois Sustainable Technology Center [online], <URL:http://www.istc.illinois.edu/info/library_docs/TR/TR051.pdf> 46 pages, Mar. 1, 2014.
Sompong et al., Microbial Degradation of musty odor in aquaculture pond, International Journal of Agricultural Technology, Dec. 1, 2018.
State of Florida, Well Completion Report, Feb. 2015, 23 Pages, Feb. 2015.
Storro, Gaute, Investigations of salt groundwater at Akvaforsk Research Institute, Sunndalsora, Norway, Geological Survey of Norway, NGU-rapport 93.029, 11 pages, Jan. 1, 1993.
Sun, Min et al, Models for estimating feed intake in aquaculture: A review, Abstract, Computers and Electronics in Agriculture, vol. 127 <URL:http://www.sciencedirect.com/science/article/pii/S0168169916304240> (Accessed Dec. 4, 2017), 4 pages, Sep. 1, 2016.
Tucker et al., Managing Off-Flavor Problems in Pond-Raised Catfish, SRAC Publication, Oct. 5, 2018.
University of Alaska, Fairbanks, School of Fisheries & Ocean Sciences, Water Source, 53 pages, <URL:https://www.sfos.uaf.edu/fitc/teaching/courses/fish336/materials/FISH%20336%20Lect%2031%20Water%20Quality%203.pdf>.
Van Der Heile, Tony et al., Composition, Treatment and Use of Saline Groundwater for Aquaculture in the Netherlands, World Aquaculture, pp. 23-27.
Almeida et al., Almeida et al. (Antibiotics, 2019; 8: 192), Oct. 24, 2019.
Guttman et al., Guttman et al. (Aquaculture, 2008; 279; 85-91), Mar. 26, 2008.
McDowall et al., Enhancing biofiltration of geosmin by seeding sand filter columns with a consortium of geosmin degrading bacteria. Water Research, 43, pp. 433-440, Jan. 1, 2009.
Jonns et al., Streptophage-Mediated Control of Off-Flavour Taint Producing Streptomycetes Isolated From Barramundi Ponds, Apr. 12, 2017.
Haberfeld, Joseph, Letter RE First Request for Additional Information (RAI), Florida Department of Environmental Protection, 6 pages, Jun. 4, 2013.
Hoefel et al., Cooperative biodegradation of geosmin by a consortium comprising three gram-negative bacteria isolated from the biofilm of a sand filter column. Letters in Applied Microbiology, 43, pp. 417-423, Jan. 1, 2006.

\* cited by examiner

FEED CONSUMPTION MONITORING SYSTEM

BACKGROUND OF THE INVENTION

Claim of Priority

The present application claims priority under 35 U.S.C. Section 119 to a currently pending, U.S. Provisional application having Ser. No. 63/154,274 and filed on Feb. 26, 2021, as well as currently pending, U.S. Provisional application having Ser. No. 63/187,126 and filed on May 11, 2021, both of which are incorporated by reference herein in their entirety.

Field of the Invention

The present invention relates generally to utilizing an aquaculture system, or more specifically, a recirculating aquaculture system (RAS) for aquaculture farming and more specifically, the present invention relates to a system for monitoring the quantity of aquaculture feed particles in RAS water to ensure aquaculture receive appropriate feed amounts. Further, the present invention relates to detecting and mitigating any inconsistencies in feed quantity to ensure a desired flavor profile and a desired size of aquaculture, as well as ensure the health of aquaculture produced by a prospective RAS.

DESCRIPTION OF THE RELATED ART

Currently, there is a recognized alarming decline in conventional fisheries, which in turn is based on overfishing and harmful environmental happenings. At present, the demand for seafood exceeds the supply available from such conventional fisheries and it is predicted that with an increased world population, the demand for seafood will double in the immediate future. Accordingly, the inability of conventional fisheries to meet such an increasing demand for seafood has resulted in an equally increasing need for aquaculture systems or "fish farms" capable of significantly high volume of seafood production.

At the present day, a recirculating aquaculture system (RAS) is commonly used in the aquaculture farming industry. Essentially, an RAS provides an aquaculture farming production a means for a financially favorable production method, at least through limiting water consumption for use in farming. RAS's have proven to be highly effective in the art of aquaculture farming and are being adopted all over the world. Although RAS's are generally well-received by the industry, when used, issues in aquaculture developing non-desired flavor profiles and RAS's experiencing unfavorable conditions are becoming more prevalent in conjunction with RAS farming. These issues are believed to be caused at least by the naturally occurring compound, Geosmin, which is an organic compound known to make water smell and taste foul to the average person. Further, these issues are also somewhat believed to be caused at least by the naturally occurring compound, 2-Methylisoborneol (MIB), which is an organic chemical also known to make water smell and taste foul to the average person. It is also known that these compounds are produced by microbiota, and/or a wide range of bacteria wherein when environmental conditions are fit, the microbiota will naturally produce such compounds. Evidence for these beliefs are at least found in tasting samples of non-desirably flavored aquacultures produced in an RAS, wherein the samples of the aquacultures have been found to contain chemical concentrations of the compounds, Geosmin and 2-Methylisoborneol and in testing for specific microbiota in the absence and in the presence of the two compounds. Thus, it becomes apparent that these issues are becoming more prevalent in RAS's and plausibly, are known to be caused by both Geosmin and MIB. Subsequently, the two compounds have been known to be called "off-flavors" or "off-flavorings" or singularly, an "off-flavor." In some cases, an off-flavor may also be an organic bromo-compound. Such "off-flavors" are undesirable.

As mentioned above, an aquaculture farming operation may experience a wide range of complications while undergoing the act of farming aquaculture. Complications from degrading water quality, nutrient imbalances within the water, harmful algae growth, inconsistent aquaculture feed, harmful organic-compound growth and/or production, declining aquaculture health, aquaculture development of disease, aquaculture death, aquaculture flavor profile degradation, and more are sure to arise in most aquaculture farming operations at some point in a farming cycle. In some cases, such complications are unable to be detected until the aquaculture farming operation has experienced negative consequences. In such cases, experiencing negative consequences may be, but not be limited to, operating at a financial loss, degradation of product (aquaculture), infected and/or un-sellable product (aquaculture), deterioration of farming facilities, and/or overworking of farming facilities. Generally, all such experiences related to the negative consequences of complications in farming aquaculture will lead to a detraction of profitability from an aquaculture farming operation.

It becomes apparent that the introduction of any substance to the RAS and the aquaculture, including aquaculture feed, can be harmful if not monitored closely. Without the ability to monitor aquaculture feed consumption levels, aquaculture may receive an inconsistent, suboptimal amount of feed and therefore experience conditions harmful to aquaculture health and flavor profile. To illustrate this point, aquaculture is typically provided with a particular measurement of feed, but the inability to measure aquaculture feed consumption levels prevents RAS farmers from obtaining valuable information pertaining to the health of aquaculture. For example, if RAS farmers were able to detect excess feed in the RAS water, this information may indicate that aquaculture could be receiving too much feed or may be undereating. Moreover, feeding aquaculture in excess may give rise to aquaculture health and flavor profile issues stemming from aquaculture overconsumption or from unconsumed feed lingering in the water, thereby altering the aquaculture environment by introducing chemicals or oils. On the other hand, if RAS farmers were able to detect a lack of feed in the RAS water, this information may signal that aquaculture could be receiving too little feed such that they are being inadequately nourished. Such information about feed quantity in the RAS water is important because it could provide RAS farmers with valuable information about aquaculture consumption rates and patterns, thereby serving as an indication of aquaculture health. Further, the ability to monitor feed quantity in the RAS water would help ensure that aquaculture achieve the desired size and flavor profile.

SUMMARY OF THE INVENTION

In view of the foregoing disadvantages that come with RAS farming, the present invention is directed to a feed consumption monitoring system for measuring the quantity of aquaculture feed particles in the RAS water to determine whether aquaculture is receiving suboptimal amounts of feed. Thus, the present invention relates to detecting and mitigating suboptimal or inconsistent aquaculture feed quantities to ensure a desired flavor profile and maintain the desired size and health of aquaculture produced by a prospective RAS.

In more specific terms, the feed validation system is comprised of a high contrast surface, a camera assembly, and a mount assembly that serves to support the foregoing components of the system. In the preferred embodiment, a software component is utilized as well, and a lighting assembly may be used. The preferred embodiment of the overall system functions by introducing to the high contrast surface a supply of running water containing a quantity of feed particles from an RAS, directed by a flow system with one end in the RAS environment and the other just above the surface of the RAS water and just below the high contrast surface. When such an introduction is made, the high contrast surface is lit by the lighting assembly, which may be a part of or operative through the camera assembly, and the camera assembly captures at least one image of the high contrast surface and water making contact. Optimally, such contact is captured by the camera assembly operating essentially as a video system with a high frame rate to capture many images per second. These images are then transmitted to a software component, which is configured to analyze the images and determine the quantity of feed particles in the supply of running water. This is possible because the particles of feed captured in the at least one image are a representative sample of the entire quantity of feed particles in the RAS environment water. As a result of the analysis, the software component is further capable of determining whether the quantity of feed particles detected is suboptimal. Following the determination of optimality, the software component can signal to an automated feed delivery system (or an RAS farmer) that a change in the quantity of feed delivered to the RAS is desirable. Thus, this system helps RAS farmers monitor and control the quantity of feed particles in the RAS, which can be indicative of aquaculture health, feeding habits, and nutritional needs. This system further helps RAS farmers achieve the desired or optimal size and flavor profile of aquaculture, which is a major, overarching goal in RAS farming.

To describe the preferred embodiment in more detail, and by way of non-limiting example, the mount assembly may be one or more pieces that is secured to or removably retained by the flow system, or a component thereof. For example, the mount assembly may be fixed or removably secured to the pipe or conduit of the flow system protruding out of the RAS water, delivering the supply of running water to the high contrast surface. Furthermore, in the preferred embodiment, the mount assembly serves to support the high contrast surface, camera assembly, and lighting assembly, and allows each of the aforementioned components to be positioned at a vertical, horizontal, or diagonal distance from one another if so desired. By way of non-limiting example, the mount assembly allows for the high contrast surface to be disposed vertically above the camera assembly, while the lighting assembly may be simultaneously disposed beside, within, or vertically above or below the camera assembly. In the preferred embodiment, however, the high contrast surface is disposed vertically above the camera assembly, and the camera assembly is held underwater within the flow system by the mount assembly, with the camera assembly's lens facing upwards at the high contrast surface. The lighting assembly may comprise or form a part of the camera assembly, and/or may be operative through the camera assembly, including the scenario where the lighting assembly simply consists of camera assembly's flash capability. If the lighting assembly is included in the system but is not a part of or operative through the camera assembly, the lighting assembly may be supported by the mount and may be disposed in any desirable position or orientation relative to the high contrast surface and the camera assembly.

The high contrast surface, by way of non-limiting example, may be comprised of a waterproof or water-resistant sheet, such as plastic, acrylic, or some other material or combination of materials, which serve to diffuse light. More specifically, in the preferred embodiment, the high contrast surface diffuses light shined onto it by the lighting assembly such that the feed particle edges have a more pronounced appearance, especially in the at least one image captured by the camera assembly. A distinct appearance of feed particle edges is desirable in these images, so as to prevent the software component from erroneously accounting for water droplets or spots of light as a particle of feed. Further, a distinct appearance of feed particle edges helps to distinguish feed particles from aquaculture waste, as feed particles typically appear cylindrical and more or less uniform whereas the latter is typically longer and irregularly shaped. The high contrast surface is secured or removably retained by the mount assembly in the preferred embodiment, but may itself be secured or removably retained to the flow system, through which the supply of running water is delivered to it.

In the preferred embodiment, there is a flow system comprising a conduit, pipe, or other channel defining a path of fluid flow for the supply of running water. Such a flow system is preferably vertically oriented and disposed to direct the supply of running water into engaging relation with the high contrast surface. In other words, the preferred embodiment has at least one pipe or water flow pathway that has one open end in the RAS environment, and another open end just near the surface of the RAS water. This pipe or pathway directs the supply of running water to come into contact with the high contrast surface, which is maintained by the mount assembly just above the flow system's opening in the preferred embodiment. Additionally, in some embodiments there may also be a filtration system within the flow system or otherwise upstream of the high contrast surface that is disposed in receiving relation to the supply of running water and structured to filter feed particles. Such a filtration system would ideally prevent whole feed pellets from striking the high contrast surface or otherwise disturbing the overall system. However, in another embodiment, the filtration system may be unnecessary or undesirable depending on various factors, such as the analysis of optimality. As mentioned above, in the preferred embodiment, the camera assembly is removably retained by the mount assembly underwater within the flow system facing upwards at and positioned at a desirable vertical distance from the high contrast surface. For production of the clearest image or images possible, the camera assembly is preferably held stationary so as to prevent any undesirable movement.

The camera assembly, which is comprised of a camera and a camera mount in one embodiment, is structured to capture images of the high contrast surface upon the high contrast surface receiving, contacting, or otherwise engaging with the supply of running water. In the preferred embodiment, the lighting assembly is comprised of light-emitting diodes (LEDs) and is structured to illuminate the high contrast surface to aid in the camera assembly's production of clear, high-contrast images upon such contact. More specifically, the lighting assembly helps generate high contrast in the images taken by the camera assembly between dark and light areas, the dark areas being the feed particles in the supply of running water. As a result, the software component in the preferred embodiment is less prone to error when analyzing the at least one image and determining the number of feed particles in the representative sample; by extension, the same is less prone to error when calculating or approximating the total number of feed particles in the entire RAS environment. Notably, in some embodiments the camera assembly and/or the lighting assembly may be operative through the software component, with the software component capable commanding the camera assembly to capture an image.

When an image is captured by the camera assembly, it is transmitted to the software component for analysis. Such analysis is determinative of the quantity of feed particles in the supply of running water delivered to the high contrast surface. As mentioned above, the quantity calculated or determined from an image is a representative sample that is indicative of the total feed particles in the RAS environment's water. The software component's analysis is further capable of determining whether the quantity of feed particles in the supply of running water is suboptimal. In one embodiment, an RAS farmer can input target feed particle values into the software component to aid in the software component's determination of optimality. In the event the feed particle quantity is found to be suboptimal, the software component of the preferred embodiment is configured to notify a feed delivery system of the undesirable condition. The feed delivery system may then alter the feed delivery quantity to the RAS environment, with the aim of rectifying the suboptimal condition. In the preferred embodiment, the feed delivery system may be an automated mechanism disposed in feed delivery relation to the environment. On the other hand, in another embodiment an RAS farmer may simply take the information from the software component's analysis and rectify the suboptimal condition by manually altering the feed quantity delivered, the delivery mechanism being a non-automated mechanism.

These and other objects, features, and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
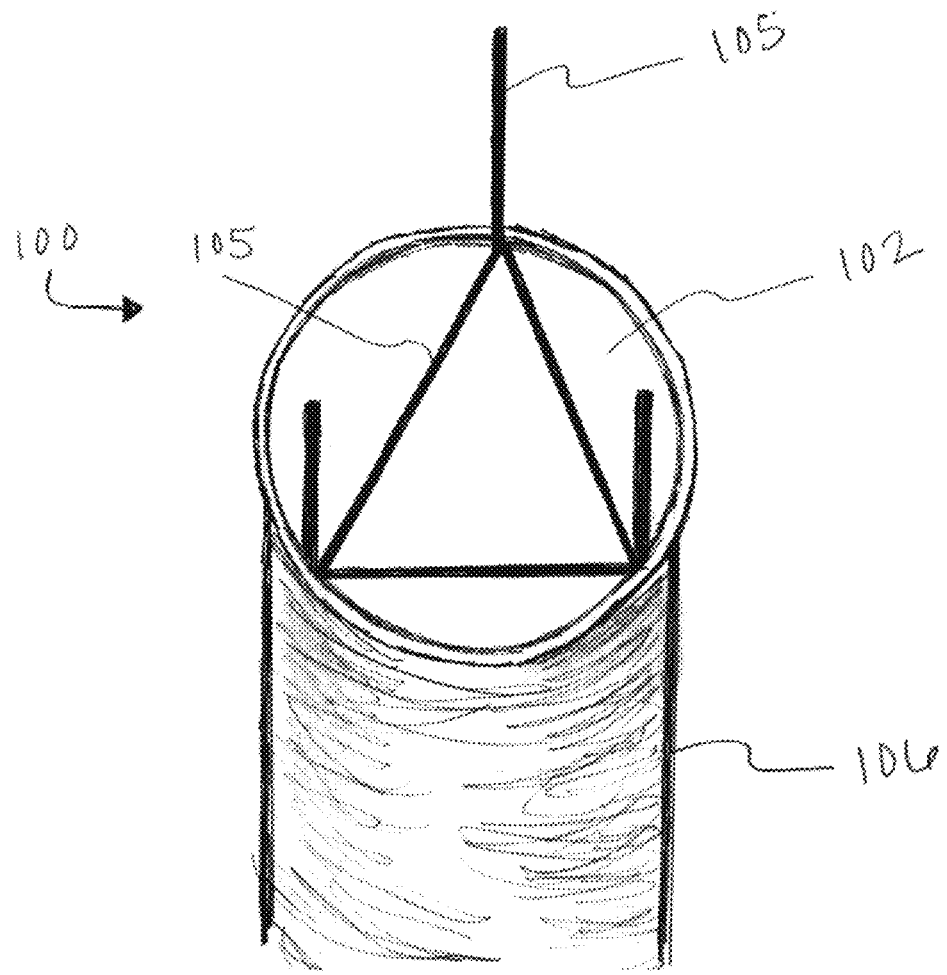
FIG. 1 is a schematic, top-front perspective view of the feed consumption monitoring system showing supporting components.

The invention now will be described more fully hereinafter with reference to the accompanying drawings in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The aquaculture system in which aquaculture are raised and farmed can be, and will be, referred to as a recirculating aquaculture system (RAS). Turning now descriptively to the figures, FIGS. 1, 2, 3, and 4 illustrate an inventive feed consumption monitoring system to monitor and control the quantity of aquaculture feed introduced to aquaculture in an RAS.

FIGS. 1, 2, 3, and 4 show that the feed consumption monitoring system 100 is primarily comprised of a high contrast surface 101, a camera assembly 103, and a mount assembly 105. In the preferred embodiment, a lighting assembly 104 is also included in the system. Further, the mount assembly 105 serves as a support structure that removably retains the foregoing components of the system 100 in the preferred embodiment. In addition, the mount assembly 105 itself is preferably removably secured to a flow system 106, through which a supply of running water 102 containing a quantity of feed particles flows.

Figure 2:
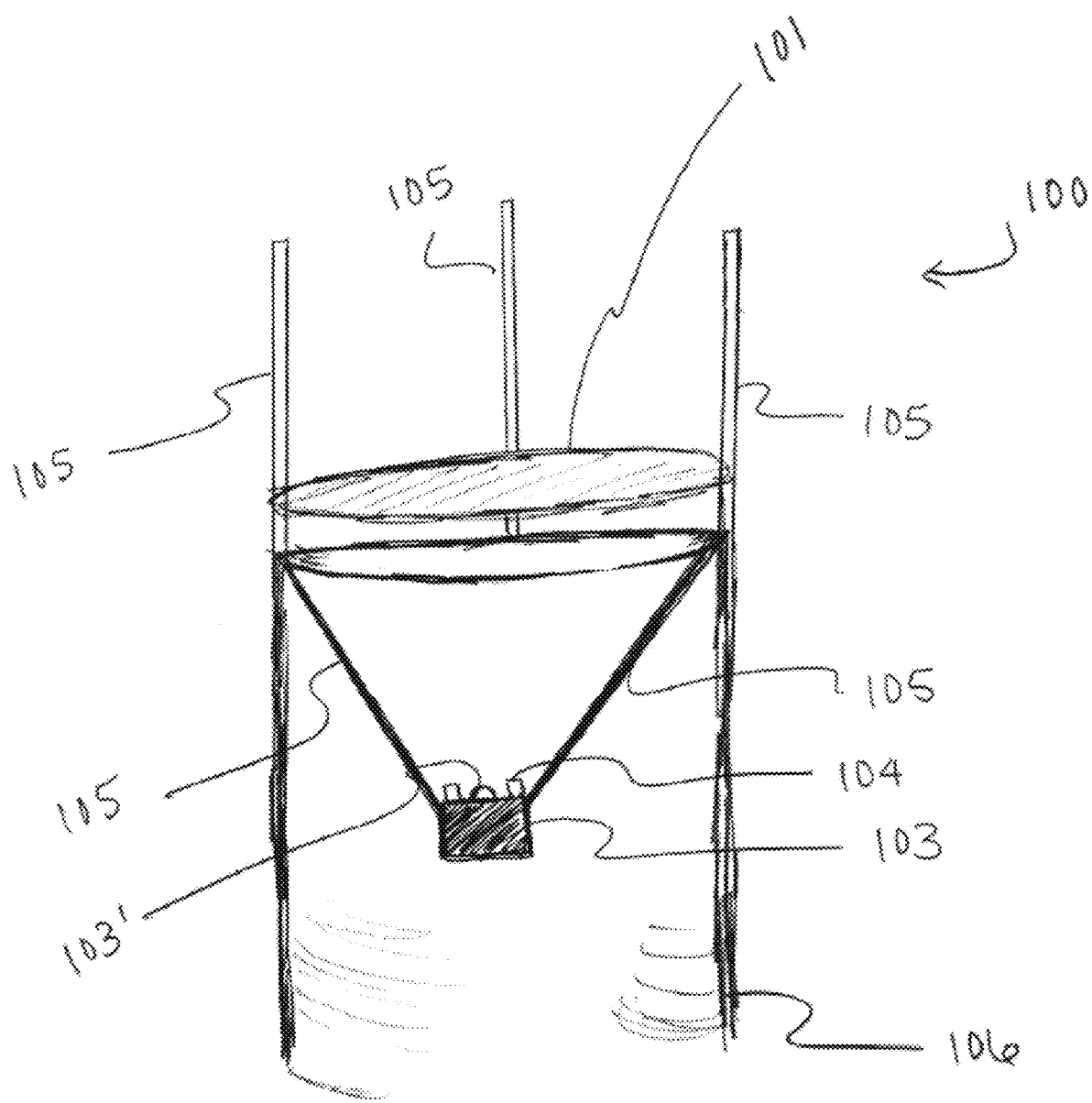
FIG. 2 is a schematic, top-front perspective view of the feed consumption monitoring system showing additional components atop the supporting components.
Figure 3:
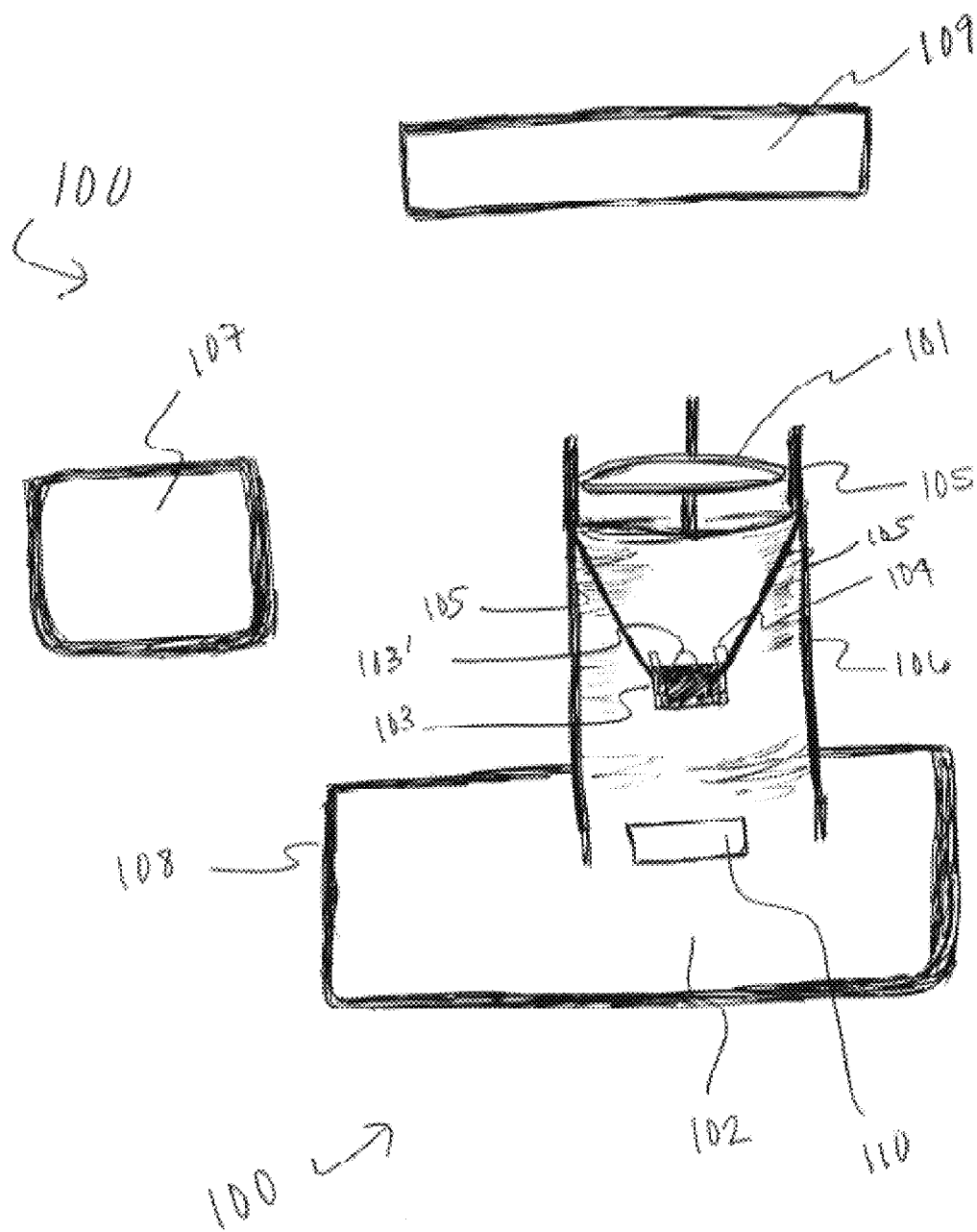
FIG. 3 is a schematic, perspective view in combination of the feed consumption monitoring system.
Figure 4:
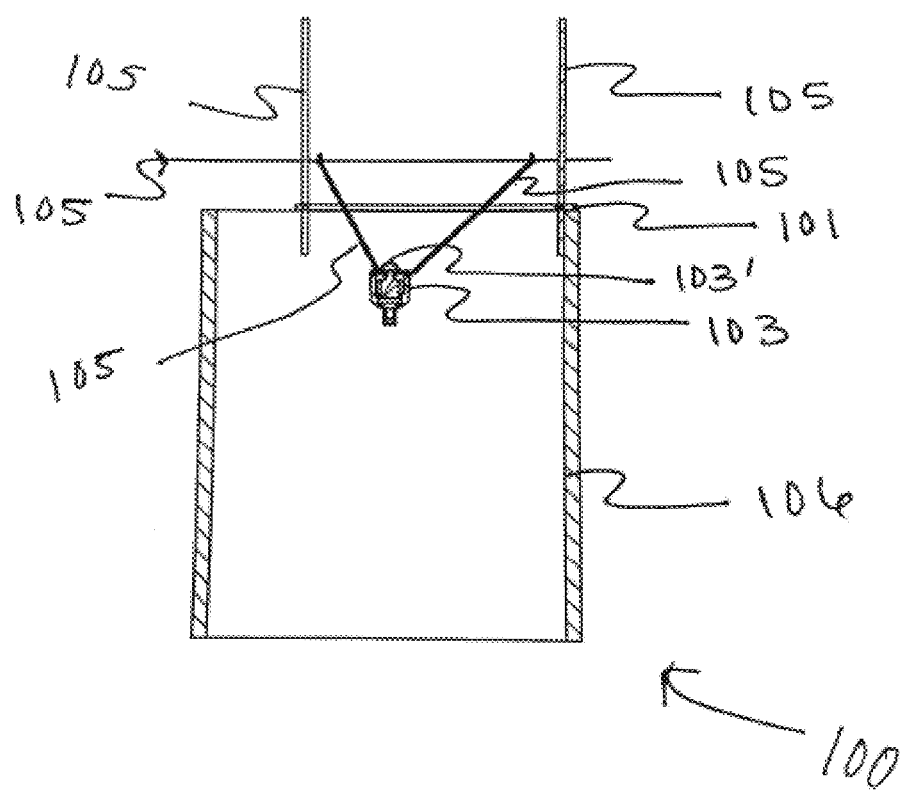
FIG. 4 is a schematic, perspective view of the feed consumption monitoring system.

To illustrate the preferred embodiment, the high contrast surface 101 is removably retained by the mount assembly 105 at a vertical distance above the top opening of the flow system 106, which breaches just above the water of the RAS environment 108. Further, the high contrast surface 101 is disposed in receiving relation to the supply of running water 102, which contains a quantity of feed particles and is directed towards the high contrast surface 101 by the flow system 106. In other words, the flow system 106 directs the supply of running water 102 upwards to contact the high contrast surface 101, which, as a result, makes the supply of running water 102 spill over the sides of the flow system 106. Next, in the preferred embodiment the camera assembly 103, which is structured to capture at least one image of the high contrast surface 101, is removably retained by the mount assembly 105 and is positioned at a vertical distance below the high contrast surface 101 underwater within the flow system, as shown in FIGS. 2, 3, and 4. The camera lens 103' of the camera assembly 103 is best situated facing upwards, pointing towards the high contrast surface 101 so as to facilitate the capturing of at least one image of the high contrast surface 101. However, in other embodiments the camera assembly 103 and/or its camera lens 103' may be positioned differently in relation to the high contrast surface to achieve the best outcome. Moreover, in the preferred embodiment the lighting assembly 104 is positioned in a manner similar to the camera assembly 103. To illustrate this, the lighting assembly 104, which may form a part of the camera assembly 103, is preferably located underwater within the flow system 106 vertically below or otherwise in illuminating relation to the high contrast surface 101. The lighting assembly 104 may also be removably retained by the mount assembly 105, or may be secured to the camera assembly 103 if not forming a part of it. It is also worth noting that the lighting assembly 104 may solely consist of the flash capability of the camera assembly 103, or such a flash capability in combination with one or more other lighting components that together form the lighting assembly 104. In summary, the best practice for the lighting assembly 104 is to situate it at a vertical distance from the high contrast surface 101 so as to enhance the appearance of the feed particles in the supply of running water 102, making such particles stand out against the high contrast surface 101.

FIG. 3 further shows that the flow system 106, comprising a conduit defining a path of fluid flow for the supply of running water 102, is vertically oriented and disposed to direct the supply of running water 102 into an engaging relation with the high contrast surface 101. In other words, and as described briefly above, in the preferred embodiment the flow system 106 directs the supply of running water 102 from the RAS environment 108 to contact the high contrast surface 101. In the same or another embodiment, a filtration system 110 disposed in receiving relation to the supply of running water 102 may be employed to filter feed particles that are upstream of the high contrast surface 101. In the preferred embodiment, upon contact or engagement between the supply of running water 102 and the high contrast surface 101, the lighting assembly 104 should be illuminated, the camera assembly 103 should be operative with the camera lens 103' facing upward, and the camera assembly 103 should capture at least one image of the high contrast surface 101 in engaging relation with the feed particle-containing supply of running water 102.

In addition, FIG. 3 depicts that the preferred embodiment further comprises a software component 107. The camera assembly 103 may be operative through the software component 107, meaning that the command for the camera assembly 103 to take at least one image may be executed through the software component 107 either automatically or manually by a user, for example. Moreover, in the preferred embodiment the software component 107 is configured to receive and analyze the at least one image taken by the camera assembly 103. Such analysis by the software component 107 is determinative of the quantity of feed particles in the supply of running water 102 delivered to the high contrast surface 101, and is also determinative of a suboptimal quantity of feed particles in the supply of running water 102. To prevent double-counting, the software component 107 is also configured to track the quantity of feed particles in the supply of running water 102 to ensure their departure from the field of view of the camera assembly 103. Upon completion of the analysis described, the software component 107 is configured to alter the quantity of feed delivered to the RAS environment 108 by communicating with a feed delivery system 109. The feed delivery system 109 is in communicating relation with the environment 108, the software component 107 being in communicating relation with the feed delivery system 109 as mentioned above. To illustrate, upon detection of a suboptimal quantity of feed particles in the supply of running water 102 through its analysis, the software component 107 notifies the feed delivery system 109 to alter the feed delivery quantity to the RAS environment 108. Notably, in the preferred embodiment the feed delivery system 109 is an automated mechanism disposed vertically above or otherwise in feed delivering relation to the RAS environment 108.

Figure 5:
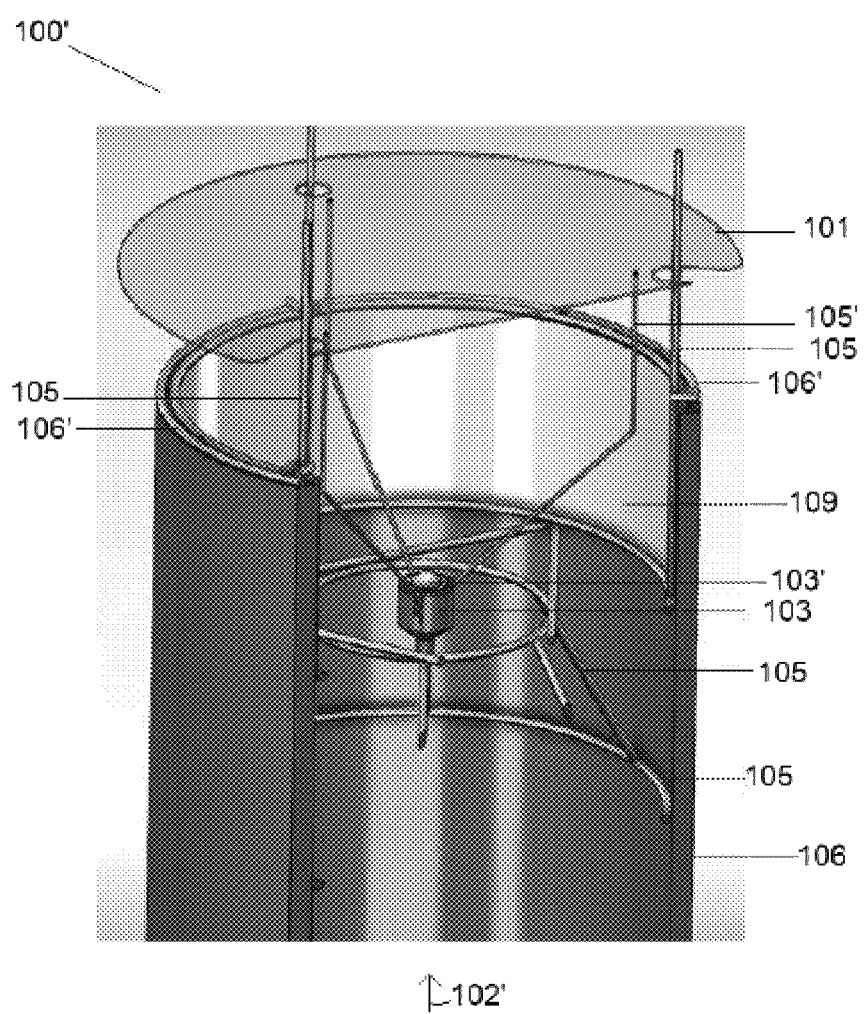
FIG. 5 is a perspective interior view of the embodiments of FIGS. 1-4.

Additional structural and operative features are represented in the embodiment of the feed consumption and monitoring system of FIG. 5, generally indicated as 100'. More specifically, the high contrast surface 101 is supported outwardly from an outer/upper "lip" or outer periphery 106' of the flow system conduit 106 by the mount 105. As also represented in this embodiment, the mount 105 is in the form of a frame-like structure including a plurality of frame legs/segments, etc. interconnected and/or cooperatively disposed to mount and support both the contrast surface 101 and the camera assembly 103. By way of nonlimiting example, the frame mount 105 may include specifically disposed legs or segments 105' intended to support and dispose the contrast surface 101 in an intended flow system conduit 106 above the outer peripheral lips 106', as explained in greater detail hereinafter.

In more specific terms, the camera assembly 103 is disposed within the flow system conduit 106 a sufficient distance from the lip 106' and the high contrast surface 101 such that the field of view of the camera assembly 103 extends at least 25 mm beyond the outer periphery or lip 106'. Accordingly, the camera assembly 103 is disposed at least 90 mm below the outer peripheral lip 106' and may be spaced a preferred or predetermined distance of 490 mm from the outer peripheral lip 106'.

Additional structural features present in the embodiment of FIG. 5 include a secondary high contrast plate, segment or surface 109 mounted on or attached to the inner surface of the flow system conduit 106, preferably adjacent and/or contiguous to the outer peripheral lip 106'. In such a mounted or attached to disposition, the secondary contrast plate or surface 109 has a curved or other appropriate configuration which corresponds to the inner surface of the flow system conduit 106 in the area adjacent the outer peripheral lip 106', as represented.

Additional structural features of the embodiment of FIG. 5 includes the diameter or transverse dimension of the high contrast surface 101 is preferably at least 50 mm greater than the diameter or corresponding transverse dimension of the open outer peripheral lip 106' of the flow system conduit 60. By way of nonlimiting example the diameter or transverse dimension of the high contrast surface 101 may be in the range of generally about 920 mm. In cooperation therewith the diameter or corresponding transverse dimension of the outer open and of the flow system conduit 106, defined by the outer peripheral lip 1 to 6' is generally about 800 mm.

Although not specifically represented, a funnel may be disposed below the camera assembly 103 and oriented to funnel the upwardly or vertically directed flow water 102', from supply of running water 102 towards the camera assembly 103 as the flow of water 102' approaches the camera assembly 103. In addition, portions of the frame like mount 105 and 105' maybe at least partially covered with a mesh-like material, also not shown.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A feed consumption monitoring system comprising:
a high contrast surface structured to receive a supply of running water, the supply of running water containing a quantity of feed particles;
a camera assembly structured to capture at least one image of said high contrast surface; and
a mount assembly structured to removably retain said camera assembly.

2. The feed consumption monitoring system of claim 1, wherein a lighting assembly is disposed in an illuminating relation to said high contrast surface.

3. The feed consumption monitoring system of claim 2, wherein said lighting assembly comprises a part of and is operative through said camera assembly.

4. The feed consumption monitoring system of claim 1, wherein said camera assembly is disposed in vertical relation to said high contrast surface.

5. The feed consumption monitoring system of claim 1, wherein said high contrast surface is removably retained by said mount assembly.

6. The feed consumption monitoring system of claim 1, wherein said mount assembly is disposed in removable relation to said high contrast surface.

7. The feed consumption monitoring system of claim 1, further comprising a flow system; said flow system comprising a conduit defining a path of fluid flow for the supply of running water; said conduit being vertically oriented and disposed to direct the supply of running water into engaging relation with said high contrast surface.

8. The feed consumption monitoring system of claim 1, further comprising a filtration system; said filtration system structured to filter feed particles disposed upstream of said high contrast surface and in receiving relation to the supply of running water.

9. The feed consumption monitoring system of claim 1, wherein said camera assembly is positioned and configured to capture at least one image of said high contrast surface upon engagement between said high contrast surface and the supply of running water containing the quantity of feed particles.

10. The feed consumption monitoring system of claim 9, wherein said camera assembly is operative through a software component, said software component structured to command said camera assembly to execute said at least one image of said high contrast surface.

11. The feed consumption monitoring system of claim 9, wherein said at least one image captured by said camera assembly is transmitted to said software component.

12. The feed consumption monitoring system of claim 11, wherein said software component is configured to monitor the departure of the quantity of feed particles from the field of view of said camera assembly.

13. The feed consumption monitoring system of claim 11, wherein said software component is configured to analyze said at least one image; said analysis determinative of the quantity of feed particles in the supply of running water delivered to said high contrast surface.

14. The feed consumption monitoring system of claim 13, wherein said software component is configured to receive said at least one image captured by said camera assembly and said analysis is further determinative of a suboptimal quantity of feed particles in the supply of running water.

15. The feed consumption monitoring system of claim 14 further comprising a feed delivery system disposed in communicating relation with a recirculating aquaculture system (RAS) environment, said software component interactive with said feed delivery system.

16. The feed consumption monitoring system of claim 14, wherein said software component is configured to alter a feed delivery quantity to the environment by notifying the feed delivery system upon detecting a suboptimal quantity of feed particles in the supply of running water.

17. The feed consumption monitoring system of claim 16, wherein the feed delivery system is an automated mechanism disposed in feed delivering relation to the environment.

18. A feed consumption monitoring system comprising:
 a high contrast surface structured to receive a supply of running water, the supply of running water containing a quantity of feed particles;
 a camera assembly structured to capture at least one image of said high contrast surface;
 a mount assembly structured to removably retain said camera assembly; and
 a software component configured to analyze said at least one image, said analysis determinative of the quantity of feed particles in the supply of running water delivered to said high contrast surface.

19. The feed consumption monitoring system of claim 18 wherein a lighting assembly is disposed in an illuminating relation to said high contrast surface.

20. The feed consumption monitoring system of claim 19 wherein said lighting assembly comprises a part of and is operative through said camera assembly.

21. The feed consumption monitoring system of claim 18 wherein said analysis is determinative of a suboptimal quantity of feed particles in the supply of running water.

22. The feed consumption monitoring system of claim 18 further comprising a feed delivery system disposed in communicating relation with an environment, said software component interactive with said feed delivery system.

23. The feed consumption monitoring system of claim 22 wherein said software component is configured to alter a feed delivery quantity to the environment by notifying the feed delivery system upon detecting a suboptimal quantity of feed particles in the supply of running water.

* * * * *